United States Patent [19]

Inoue et al.

[11] Patent Number: 5,276,232
[45] Date of Patent: Jan. 4, 1994

[54] PROCESS FOR PREPARING HIGH-OCTANE GASOLINE BLENDING STOCK

[75] Inventors: Shinichi Inoue; Toshiji Makabe, both of Yokohama; Tatsuo Morimoto, Yokosuka; Kazutomo Shimizu, Yokohama, all of Japan

[73] Assignee: Research Association For Utilization of Light Oil, Tokyo, Japan

[21] Appl. No.: 39,179

[22] PCT Filed: Aug. 19, 1992

[86] PCT No.: PCT/JP92/01047
§ 371 Date: Apr. 16, 1993
§ 102(e) Date: Apr. 16, 1993

[87] PCT Pub. No.: WO93/04145
PCT Pub. Date: Apr. 3, 1993

[30] Foreign Application Priority Data

Aug. 20, 1991 [JP] Japan ................................. 3-231075

[51] Int. Cl.$^5$ .............................................. C07C 2/00
[52] U.S. Cl. .................... 585/415; 585/407; 585/417
[58] Field of Search ................ 585/415, 417, 407

[56] References Cited

U.S. PATENT DOCUMENTS

| | | | |
|---|---|---|---|
| 4,761,511 | 8/1988 | Barlow | 585/415 |
| 4,994,254 | 2/1991 | Suzuki et al. | 585/415 |
| 5,073,673 | 12/1991 | Hirabayashi et al. | 585/415 |

FOREIGN PATENT DOCUMENTS

| | | |
|---|---|---|
| 56-139233 | 10/1981 | Japan . |
| 57-100914 | 6/1982 | Japan . |
| 60-501357 | 8/1985 | Japan . |
| 62-254847(A) | 6/1987 | Japan . |
| 1-224216 | 9/1989 | Japan . |
| 2-184517 | 7/1990 | Japan . |
| 64-232859(A) | 4/1991 | Japan . |

*Primary Examiner*—Asok Pal
*Attorney, Agent, or Firm*—Armstrong, Westerman, Hattori, McLeland & Naughton

[57] ABSTRACT

The process of this invention produces high-octane gasoline blending stock advantageously by treating light hydrocarbons mainly comprising of paraffins and/or olefins having 2 to 7 carbon atoms at a hydrogen partial pressure of 5 kg/cm$^2$ or less and at a temperature of 350° to 650° C. in the presence of a catalyst composition containing ammonia-modified crystalline aluminogallosilicates of high initial activity and long life obtained by contacting hydrogen type aluminogallosilicates with ammonia under a dry condition as catalyst component.

6 Claims, No Drawings

PROCESS FOR PREPARING HIGH-OCTANE GASOLINE BLENDING STOCK

FIELD OF TECHNOLOGY

This invention relates to a process for preparing high-octane gasoline blending stock mainly comprising of aromatic hydrocarbons.

BACKGROUND TECHNOLOGY

Catalytic reforming of straight-run naphtha in the presence of a platinum-alumina catalyst has been adopted widely as a process for preparing high-octane gasoline on a commercial basis. As naphtha to be fed to this catalytic reforming, a fraction boiling in the range from 70° to 180° C. is used for the preparation of automotive gasoline while a fraction boiling in the range from 60° to 150° C. is used for the preparation of BTX.

With this type of catalytic reforming, the conversion of feed naphtha to aromatic hydrocarbons decreases markedly as the number of carbon atoms in the naphtha decreases and this makes it difficult to prepare high-octane gasoline blending stock from light hydrocarbons mainly comprising of paraffins and/or olefins having 2 to 7 carbon atoms. For this reason, light hydrocarbons find limited uses as raw materials for the production of petrochemicals and city gas under the present conditions.

In consequence, technologies for preparing high-octane gasoline blending stock from light hydrocarbons are drawing attention in recent years as they enhance the value added of light hydrocarbons and accomodate increasing gasoline consumption.

The technologies proposed thus far for the preparation of high-octane gasoline blending stock from light hydrocarbons utilize a variety of catalysts: for example, hydrogen type ZSM-5, Ga-impregnated and/or Ga-exchanged hydrogen type aluminosilicates of MFI structure, hydrogen type gallosilicates of MFI structure, steam-modified crystalline galloaluminosilicates obtained by treating hydrogen or ammonium type galloaluminosilicates of MFI structure with steam [Kohyo Tokkyo Koho 60-501, 357 (1985)], and hydrogen type aluminogallosilicates of MFI structure described in an invention of the present inventors, Japan Kokai Tokkyo Koho No. Sho 62-254, 847 (1987).

However, hydrogen type ZSM-5, Ga-containing aluminosilicates, and crystalline gallosilicates are inferior to hydrogen type crystalline aluminogallosilicates as catalyst for the production of aromatic hydrocarbons. On the other hand, the aforesaid steam-modified crystalline galloaluminosilicates have structural defects as steam eliminates aluminum together with gallium from the skeletal structure during the modification with steam; they are likely to suffer permanent degradation of their catalytic activity in the course of their prolonged use and they are not yet satisfactory for commercial use. The aluminogallosilicates described in Japan Kokai Tokkyo Koho No. Sho 62-254, 847 (1987) do not show noticeable detachment of gallium from the crystal skeletal structure even in an atmosphere of hydrogen; however, they yield gradually less and less of aromatic hydrocarbons over a prolonged period of time with the selectivity to aromatic hydrocarbons being not sufficiently high and they still need to be improved in order to be commercially acceptable.

In the reactions directed to the preparation of high-octane gasoline blending stock from light hydrocarbons, it is important to maintain the yield of aromatic hydrocarbons at a high level stably over a prolonged period of time. Those catalysts which show a high activity in the initial phase but degrade easily, for example, suffer a severe loss of the activity by deposition of coke, are not suitable for commercial applications. Ideal catalysts are those which show a high activity initially and maintain that activity for a long period or to have a long life.

The reactions for the preparation of high-octane gasoline blending stock from light hydrocarbons in the presence of zeolite catalysts generally detest the presence of moisture.

The reaction of this kind is usually conducted at high temperature in the range from 300° to 700° C. If any moisture into contact with the catalyst at such a high temperature, it extracts the aluminum atoms in the catalyst or it causes dealumination and the resulting structural defects in the catalyst at times make it impossible to maintain the catalyst activity at a specified level. For this reason, a key point in the operation of a process involving the reaction of this kind is how to maintain the system dry, which is essential for the maximization of catalyst life. In consequence, a variety of devices have been installed for the removal of moisture; for example, one process adopts a dryer and another a device for the separation of moisture by adsorption.

In contrast to this, what Japan Tokkyo Koho No. Hei 1-47, 224 (1989) proposes for the enhancement of the activity of acid type zeolite catalysts is to contact zeolites with water under specified conditions or to effect such contact with water in the presence of ammonia. According to this process, acid type zeolite catalysts having a silica to alumina mol ratio of at lease 12 and a control index of 1 to 12 are contacted with water under the conditions of time, temperature, and partial pressure of water satisfying a specific relationship. In particular, this process is understood to be designed for the improvement of acid activity/decomposition activity attributable to acid sites of zeolites. In the aromatization reaction of light hydrocarbons such as relating to this invention, however, it is necessary to suppress the decomposition reaction accompanied by the formation of light gases such as methane and ethane and let the activity of dehydrocyclization take precedence of that for the decomposition reaction. Therefore, it is not possible to let the zeolites of this process as they are serve as crystalline aluminogallosilicates suitable for the preparation of high-octane gasoline blending stock from light hydrocarbons. Moreover, even if the conditions of time, temperature, and partial pressure of water are established on the basis of the aforesaid specific relationship, they are difficult to realize in practice. In addition, the realization will need special equipment, which is a disadvantage from the economical viewpoint. Furthermore, the treatment with steam surely improves the initial activity of the catalyst, but it causes dealumination in a portion of the catalyst structure and adversely affects the catalyst life.

The present inventors have conducted extensive studies to overcome the aforesaid problems and found that, in the reaction for the preparation of high-octane gasoline blending stock from light hydrocarbons in the presence of a catalyst composition containing crystalline aluminogallosilicates as catalyst component, the use of ammonia-modified crystalline aluminogallosilicates obtained by treatment with ammonia under specified conditions as such catalyst component markedly improves not only the initial catalyst activity but also the catalyst life and advantageously produces high-octane gasoline blending stock. That is, said crystalline aluminogallosilicate catalysts with a dual function of decomposition and dehydrocyclization can be improved markedly in their dehydrocyclization activity and life by the modification with ammonia. This invention has been completed on the basis of this finding.

Accordingly, it is an object of this invention to provide a process for preparing high-octane gasoline blending stock which comprises modifying crystalline aluminogallosilicates for use as catalyst component, preparing therefrom catalysts of high initial activity and long life, and preparing high-octane gasoline blending stock advantageously from light hydrocarbons with the use of said catalysts.

Another object of this invention is to provide a process for preparing high-octane gasoline blending stock which comprises modifying crystalline aluminogallosilicates in such a manner as to make them serve as a component of the catalyst for the preparation of high-octane gasoline blending stock from light hydrocarbons while enabling said catalyst to achieve high initial activity and long life and produce advantageously high-octane gasoline blending stock from light hydrocarbons.

A further object of this invention is to provide a process for preparing high-octane gasoline blending stock advantageously from light hydrocarbons, particularly those mainly comprising of paraffins and/or olefins having 2 to 4 carbon atoms.

DISCLOSURE OF THE INVENTION

This invention thus relates to a process for preparing high-octane gasoline blending stock by treating light hydrocarbons mainly comprising of paraffins and/or olefins having 2 to 7 carbon atoms in the presence of a catalyst composition containing crystalline aluminogallosilicates as catalyst component at a hydrogen partial pressure of 5 kg/cm$^2$ or less and at a temperature in the range from 350° to 650° C. wherein ammonia-modified aluminogallosilicates obtained by contacting hydrogen type aluminogallosilicates with ammonia under a dry condition of a moisture content of 100 ppm or less, preferably 10 ppm or less, as catalyst component.

In this invention, the light hydrocarbons to be used as feedstock mainly consist of linear and/or cyclic paraffins and/or olefins having 2 to 7 carbon atoms and their concrete examples are a light naphtha fraction with a boiling point of 100° C. or less mainly containing paraffins having 5 to 7 carbon atoms, gases from FCC units, gases from naphtha reformers, and LPG containing ethane, ethylene, propane, propylene, butane, and butylene. The process of this invention is capable of preparing high-octane gasoline blending stock from light hydrocarbons mainly comprising of paraffins and/or olefins having 2 to 4 carbon atoms in as high yields as from light hydrocarbons having 5 to 7 carbon atoms and is applicable most advantageously to light hydrocarbons mainly comprising of paraffins and/or olefins having 2 to 4 carbon atoms as feedstock.

The high-octane gasoline blending stock obtained by the process of this invention show a research octane number of 95 or more and contain large quantities of aromatic hydrocarbons having 6 to 10 carbon atoms including benzene, toluene, and xylene. The high-octane gasoline blending stock in question are useful for automotive fuels or for the production of aromatic hydrocarbons.

The crystalline aluminogallosilicates to be used in this invention have SiO$_4$, AlO$_4$, and GaO$_4$ arranged in a tetrahedron in their skeleton and they are prepared by such methods as gel crystallization by hydrothermal synthesis, insertion of gallium into crystal lattices of crystalline aluminosilicates, and insertion of aluminum into the skeletal structure of crystalline gallosilicates.

In this invention, the crystalline aluminogallosilicates prepared as mentioned above are mixed with binders, kneaded, molded, and calcined to yield a catalyst composition of a specified shape. The composition is first converted to the ammonium type by treatment with an aqueous solution of ammonium, then converted to the hydrogen type by calcination, the hydrogen type aluminogallosilicates are contacted with ammonia under a dry condition, and the resulting ammonia-modified crystalline aluminogallosilicates are used as catalyst.

Gel crystallization is an advantageous process for preparing the aforesaid crystalline aluminogallosilicates as it allows simultaneous inclusion of the intended quantities of aluminum and gallium.

According to this process, a water-based uniform and fine mixture of source materials for silica, alumina, and gallia, essential ingredients for the silicate synthesis, forms crystalline aluminogallosilicates when maintained under the conditions for hydrothermal synthesis. Examples of the source materials are silicates such as sodium silicate and potassium silicate, colloidal silica, powdered silica, fused silica, and water glass for silica, aluminum salts such as aluminum sulfate and aluminum nitrate, aluminate salts such as sodium aluminate, and alumina gel for alumina, and gallium salts such as gallium nitrate and gallium chloride and gallium oxide for gallia. In addition, it is possible to use solutions or hydroxides containing aluminum and gallium obtained in the course of extraction and smelting of deposits of bauxite and zinc ore as sources for alumina and gallia.

The aforesaid water-based mixture of raw materials contain, in addition to the essential ingredients, auxiliary ingredients such as organic additives, sources for alkali metals and alkaline earth metals, and pH adjusting agent for the purpose of accelerating the growth of the intended crystalline aluminogallosilicates, improving the product purity, and obtaining products of good quality. The organic additives useful for this purpose are quaternary ammonium salts such as tetrapropylammonium salts, tetrabutylammonium salts, tripropylmethylammonium salts, amines such as propylamine, butylamine, aniline, dipropylamine, dibutylamine, and morpholine, aminoalcohols such as ethanolamine, diglycolamine, and diethanolamine, alcohols such as ethanol, propyl alcohol, ethylene glycol, and pinacol, organic acids, ethers, ketones, amino acids, esters, thioalcohols, and thioethers. It is also possible to use compounds which generate the above-mentioned organic additives under the conditions for hydrothermal synthesis. The sources for alkali metals and alkaline earth metals include hydroxides, halides, sulfates, nitrates, and carbonates of alkali metals such as sodium and potassium and alkaline earth metals such as magnesium and calcium while the pH adjusting agent include mineral acids such as sulfuric acid and nitric acid.

The water-based raw material mixture of one or more each of the essential ingredients and the auxiliary ingredients is held at 50° to 300° C., preferably at 140° to 300°

C., more preferably at 150° to 250° C., with stirring under the self pressure for 1 hour to 7 days, preferably 2 hours to 5 days, to effect crystallization and yield crystalline aluminogallosilicates. Crystalline aluminogallosilicates of higher reactivity are obtained efficiently by setting the crystallization temperature in the range from 140° to 300° C., preferably from 150° to 250° C. Reactive crystalline aluminogallosilicates can also be obtained even at 140° C. or less if the crystallization time is extended. However, such extension in crystallization time is not economical. The zeolite crystal phase of the crystalline aluminogallosilicates is a quasi-stable phase and it is not desirable to place such crystalline aluminosilicates under the conditions for hydrothermal synthesis for any prolonged period of time as there is a possibility of their becoming contaminated with other unintended phases under these conditions.

In the hydrothermal synthesis of crystalline aluminogallosilicates, the particle size is affected by the following factors; kind of silica source, amount of organic additives such as quaternary ammonium salts, amount and kind of inorganic salts as mineralization agent, amount of bases in gels, pH of gels, and temperature and agitation speed during crystallization. Proper control of these factors yields crystalline aluminogallosilicates containing 80% by weight or more of particles with their diameter in the range from 0.1 to 19 μm.

It is proper to specify that the particle diameter of crystalline aluminogallosilicates is distributed in the range from 0.05 to 20 μm. The distribution of Si, Al, and Ga becomes nonuniform in particles with a diameter of more than 20 μm and this nonuniformity damages the catalyst performance when used as catalyst component. The reacting molecules diffuse at a lower rate in zeolites where the size of the molecules is the same as the pore size. Therefore, in particles with their diameter in excess of 20 μm, the reacting molecules find it difficult to approach active sites in the deep interior of the pores and the active sites are not effectively utilized in the reaction. Moreover, coke deposits on the outer surface plug the pore inlet and make the deep interior of pores not available to the reaction, resulting in decreases in the activity and selectivity.

Analysis by MASNMR (Magic Angle Spinning Nuclear Magnetic Resonance) can offer useful information directly or indirectly on the elements and their compositions in the crystal structure of crystalline silicates. For example, $^{27}$Al-NMR gives information on the tetrahedral arrangement of Al in the anionic skeletal structure in crystalline aluminosilicates. Also, $^{29}$Si-NMR provides information on four tetrahedrons (TiO$_4$: T=Al, Ga, Si) adjacent to (SiO$_4$). In the crystalline aluminogallosilicates of this invention, the presence of tetrahedrally arranged Al and Ga in the skeletal structure has been confirmed by $^{27}$Al-NMR and $^{71}$Ga-NMR and the mol ratio of SiO$_2$/(Al$_2$O$_3$+Ga$_2$O$_3$) in the crystal structure has been calculated from the information provided by $^{29}$Si-NMR. The value has agreed well with the results of elementary analysis.

In the crystalline aluminogallosilicates to be used in this invention, the reactivity is affected by the composition. In order to obtain a high reactivity, it is desirable that the composition in question contains 0.1 to 2.5% by weight of aluminum and 0.1 to 5.0% by weight of gallium. Furthermore, the mol ratio SiO$_2$/(Al$_2$O$_3$+Ga$_2$O$_3$) is 17 to 606, preferably 19 to 200, the mol ratio of SiO$_2$/Al$_2$O$_3$ is 32 to 870, preferably 35 to 300, and the mol ratio of SiO$_2$/Ga$_2$O$_3$ is 36 to 2,000, preferably 40 to 500, and the composition is desirably aM$_{2/n}$O•bAl$_2$O$_3$•Ga$_2$O$_3$•cSiO$_2$ as expressed in mol ratio of the oxide obtained by calcining at 500° C.

In this formula, M designates alkali metal or alkaline earth metal, n designates the valence of alkali metal or alkaline earth metal, a is a positive number equal to (b+1)±3.0, preferably (b+1)±2.0, b is 0.04 to 62.5, preferably 0.1 to 14.0, and c is 36 to 2,000, preferably 40 to 500.

The crystalline aluminogallosilicates particularly useful for this invention have a crystal structure of MFI type and/or MEL type. Crystalline aluminogallosilicates of MFI type and MEL type belong to the known zeolite structures published by the Structure Commission of the International Zeolite Association [Atlas of Zeolite Structure Types, W. M. Meiyer and D. H. Olson (1978) distributed by Polycrystal Book Service, Pittsuburgh, Pa., USA].

In this invention, the crystalline aluminogallosilicates prepared as mentioned above by the insertion of gallium into the lattice of aluminosilicate zeolites or the insertion of aluminum into the skeleton of crystalline gallosilicates are mixed with a binder, kneaded with water, molded into a desired shape, and calcined at a specified temperature to furnish molded objects.

The binder here is used to enhance the mechanical properties (strength, abrasion resistance, and moldability) of the catalyst and its examples are inorganic oxides such as alumina, alumina-boria, silica, and silica-alumina. Its amount is 10 to 70% by weight of the catalyst composition. It is desirable to use a binder containing alumina for effective modification with ammonia. It is possible to improve the mechanical strength of the molded objects further by addition of phosphorus.

A mixture of the crystalline aluminogallosilicates and the binder is submitted to extrusion molding, spray drying, tableting, rolling granulation, or granulation in oil to yield a variety of molded objects such as granules, spheres, plates, and pellets. It is desirable to apply an organic lubricant during molding to improve moldability.

The resulting mixture is calcined at 350° to 700° C.

The calcined molded catalyst is first converted to the ammonium type by treatment with an aqueous solution of ammonium and then converted to the hydrogen type by calcination. The conversion to the ammonium type is effected with the use of a 0.1 to 4 normal aqueous solution of ammonium such as ammonium nitrate, ammonium chloride, and ammonium fluoride by adding 0.5 to 10 ml. of the aqueous solution of ammonium to 1 g. of the molded object and repeating ion exchange normally 1 to 5 times, preferably 2 to 4 times, each time at 20° to 100° C. for 0.5 to 10 hours. The conversion to the hydrogen type is effected by calcining the molded ammonium type catalyst in air at 200° to 800° C., preferably 350° to 700° C., for 1 to 24 hours, preferably 2 to 10 hours.

It is possible to add metals as auxiliary components to the ammonia-modified crystalline aluminogallosilicates of this invention for the purpose of improving the dehydrogenation ability further or suppressing the deposition of carbon. Such metals may be added to the binders, to the molded objects of catalyst after conversion to the ammonium type and before conversion to the hydrogen type by calcination, or to the step for hydrothermal synthesis together with the sources for silica, alumina, and gallia. The auxiliary metals effective for improving the catalyst activity include magnesium, calcium, strontium, barium, lanthanum, cerium, titanium, vanadium, chromium, molybdenum, tungsten, manganese, rhenium, iron, ruthenium, cobalt, rhodium, iridium, nickel, palladium, platinum, copper, silver, zinc, gallium, indium, germanium, tin, lead, phosphorus, antimony, bismuth, and selenium. These metals may be used singly or as a mixture of two or more, and their addition is 0.1 to 10% by weight as metal. The auxiliary metals effective for suppressing the deposition of coke during the reaction include magnesium, calcium, lanthanum, cerium, ruthenium, and iridium and one or more of them is added in a proportion of 0.01 to 5% by weight as metal.

A catalyst composition containing the hydrogen type crystalline aluminogallosilicates thus prepared is modified by contact with ammonia under a dry condition.

The modification with ammonia is effected normally at room temperature to 700° C., preferably 300° to 600° C., for 0.1 to 24 hours, preferably 1 to 10 hours, by using ammonia gas or a linear amine which generates ammonia at the treating temperature such as methylamine, ethylamine, and butylamine as a source of ammonia. The pressure is applied at a level sufficient for the absorption of ammonia gas and it is normally 5 kg/cm$^2$ or less. Where ammonia gas is used as a source of ammonia, it is preferably to use a mixture of the ammonia gas with an inert gas, such as nitrogen and argon, and/or hydrogen in a suitable proportion, for example, 0.1 to 50% by volume of ammonia gas and 50 to 99.9% by volume of an inert gas and/or 0.1 to 99.0% by volume of hydrogen. As a consequence, such as gas mixture may be an effluent from an ammonia synthesis unit which is filled with an ammonia synthesis catalyst and fed with a gas mixture of hydrogen and nitrogen, said unit installed in front of a reactor filled with the aluminogallosilicates to be modified.

The catalyst composition containing the ammonia-modified crystalline aluminogallosilicates of this invention is prepared as above and possesses a very high initial activity and a long life as a catalyst for the preparation of high-octane gasoline blending stock from light hydrocarbons.

According to the process of this invention, high-octane gasoline blending stock are prepared from light hydrocarbons in the presence of a catalyst composition containing the ammonia-modified crystalline aluminogallosilicates such as above.

The reaction temperature is set in consideration of the composition of reactant light hydrocarbons and the yield of high-octane gasoline blending stock and it is set preferably in the range from 350° to 650° C. A temperature lower than this suppresses the secondary formation of light gases such as methane and ethane but lowers the yield of high-octane gasoline blending stock. A temperature higher than this increases the yield of high-octane gasoline blending stock, but accelerates the deactivation of the catalyst by deposition of coke and necessitates more frequent regeneration of the catalyst. The temperature is desirably in the range from 450° to 650° C. where the feed light hydrocarbons mainly consist of n-paraffins, from 400° to 600° C. where the feed light hydrocarbons mainly consist of isoparaffins, and 350° to 550° C. where the feed light hydrocarbons mainly comprise of olefins.

The reaction pressure does not need to be particularly high as it is possible to produce high-octane gasoline blending stock in high yields even at atmospheric pressure. Reactions including dehydrogenation occur during the conversion of light hydrocarbons to high-octane gasoline blending stock and this means that hydrogen is present at enough partial pressure to accommodate the reaction without addition of hydrogen under the prevailing conditions. Intentional addition of hydrogen has an advantage of suppressing the deposition of coke and reducing the frequency of catalyst regeneration, but it is not necessarily beneficial because the yield of high-octane gasoline blending stock rapidly decreases with increasing hydrogen partial pressure. It is therefore desirable to maintain the partial pressure of hydrogen at 5 kg/cm$^2$ or less.

The recycle of the light gases mainly comprising of methane and/or ethane recovered from the reaction products helps to suppress the deposition of coke on the catalyst and maintain the yield of aromatic hydrocarbons at a high level over a prolonged period of time. This recycle of light gases produces a particularly large effect in relation to the use of ammonia-modified crystalline aluminogallosilicates specified by this invention. The amount of light gases to be recycled is preferably 0.5 to 3 parts by weight per 1 part by weight of the feed hydrocarbons.

The catalyst composition containing the ammonia-modified crystalline aluminogallosilicates of this invention gradually loses its activity and degrades while in use. The degraded catalyst composition can be reactivated for reuse by the same treatment as for the aforesaid modification with ammonia, namely, by contacting the degraded catalyst with ammonia gas or with methylamine or ethylamine which generates ammonia at the treating temperature under a dry condition in the range from room temperature to 700° C., preferably from 300° to 600° C., for 0.1 to 24 hours, preferably 1 to 10 hours. This treatment for reactivation can be given advantageously when the catalyst activity falls to 80% or less, preferably 90% or less, of the initial value after repeated regeneration by burning of coke off the catalyst composition. The reactivation may be undertaken outside or inside the reactor.

It is also possible to introduce ammonia in admixture with the feedstock during the reaction under a dry condition and this can be done before or after the catalyst regeneration.

The process of this invention can be put into practice by any of fixed-bed, mobile-bed, and fluidized-bed processes. The flow rate of reactants expressed as gas space velocity is 100 to 10,000 hr $^{-1}$, preferably 100 to 2,000 hr $^{-1}$, in the case of a fixed-bed process. The contact time is so chosen as to be equal to that for a fixed-bed process where other processes are adopted.

Catalyst compositions containing the ammonia-modified crystalline aluminogallosilicates of this invention can be utilized as catalysts for the conversion of light hydrocarbons as mentioned above and, in addition, their properties as solid acids enable their use as catalysts for the isomerization, alkylation, and disproportionation of hydrocarbons and to the aromatization of methanol. Because of their dehydrogenating function, they can be used also as catalysts for the production of light olefins, for example, the production of propylene by the dehydrogenation of propane.

In the course of the modification with ammonia of this invention, it is likely that aluminum and/or gallium which has detached itself from the crystal skeletal structure during the preparation or regeneration of the catalyst returns to the crystal skeleton as a result of the modification with ammonia. Therefore, the modification with ammonia of this invention produces the effects of enhancing the activity and prolonging the life of catalyst compositions containing the conventional crystalline gallosilicates.

PREFERRED EMBODIMENTS OF THE INVENTION

This invention will be described in detail below with reference to the accompanying examples and comparative examples. This invention, however, is not limited to these examples unless it deviates from its substance.

SUPPLEMENTARY EXAMPLE 1

Preparation of Crystalline Aluminogallosilicates

Solution (I) containing 1,706.1 g. of sodium silicate [J sodium silicate No. 3: 28 to 30% by weight of $SiO_2$, 9 to 10% by weight of Na, and balance water; available from Nippon Chemical Industrial Co., Ltd.] and 2,227.5 g. of water and solution (II) containing 64.2 g. of $Al_2(SO_4)_3 \cdot 14 \sim H_2O$ [reagent of special grade, available from Wako Pure Chemical Industries, Ltd.], 32.8 g. of $Ga(NO_3)_3 nH_2O$ [Ga, 18.51%, available from Soekawa Rikagaku K.K.], 369.2 g. of tetrapropylammonium bromide, 152.1 g. of $H_2SO_4$ (97% by weight), 26.6 g. of $NaCl_3$, and 2,975.7 g. of water were prepared.

Solution (II) was added slowly to solution (I) with stirring at room temperature. The resulting mixture was stirred vigorously in a mixer for 5 to 15 minutes to break up the gel into a homogeneous milky state.

This mixture was then introduced into a stainless steel autoclave and allowed to crystallize at 165° C. and at an agitation speed of 100 rpm for 72 hours under self pressure. After completion of the crystallization, the mixture was filtered to recover a solid product and washing and filtration were repeated five times with the use of approximately 5.1 of water.

The solid thus separated was dried at 120° C. and calcined at 650° C. in a stream of air for 3 hours. The calcined product had the MFI structure with the mol ratios of $SiO_2/Al_2O_3 = 64.8$, $SiO_2/Ga_2O_3 = 193.2$, and $Si/(Al_2O_3 + Ga_2O_3) = 48.6$ by X-ray diffractometry.

SUPPLEMENTARY EXAMPLE 2

Preparation of catalysts

The aforesaid crystalline aluninogallosilicates were mixed with alumina powders (Cataloid AP, available from Catalysts and Chemicals Industries Co., Ltd.) as binder at a ratio by weight of roughly 65:35, water was added, the mixture was kneaded thoroughly and extrusion-molded, and the molded objects were dried at 120° C. for 3 hours and calcined at 600° C. in air for 3 hours.

Each molded object was mixed with an aqueous solution of ammonium nitrate of approximately 2N at a rate of 5 ml. of the solution to 1 g. of the molded object and ion exchange was effected at 100° C. for 2 hours. Each molded object was treated in this manner repeatedly four times and then dried at 120° C. for 3 hours to yield an ammonium type catalyst or Catalyst A.

Catalyst A was calcined at 600° C. in air for 3 hours to yield a hydrogen type crystalline aluminogallosilicate catalyst or Catalyst B.

COMPARATIVE EXAMPLE 1

Conversion of n-hexane

The conversion of n-hexane was carried out in a flow reactor with the use of Catalyst B described in Supplementary Example 2 under the conditions where the temperature was 538° C., the pressure 1 atmosphere, the LHSV 2 $hr^{-1}$, the amount of catalyst (passing 16 to 28 mesh) 3 ml., and the reaction time 25 hours. The reaction products were analyzed by a gas chromatograph directly connected to the reactor. The results are shown in Table 1.

EXAMPLE 1

Conversion of n-hexane

The catalyst was prepared by contacting Catalyst B described in Supplementary Example 2 with a gas mixture of 25% by volume of ammonia and 75% by volume of $N_2$ at room temperature for 1.5 hours. The gas mixture contained 1 ppm of moisture. The conversion of n-hexane was carried out with the use of this catalyst under the same conditions as in Comparative Example 1. The results are shown in Table 1.

EXAMPLE 2-1

Conversion of n-hexane

The catalyst was prepared by contacting Catalyst B described in Supplementary Example 2 with a gas mixture of 25% by volume of ammonia and 75% by volume of $N_2$ at 500° C. for 3 hours. The conversion of n-hexane was carried out with the use of this catalyst under the same conditions as in Comparative Example 1. The results are shown in Table 1.

EXAMPLE 2-2

Confirmation of sustained catalyst activity after regeneration

The conversion of n-hexane was carried out three times by using the same catalyst as in Example 2-1 and regenerating it between each run. The results are shown in Table 1. It is shown that the activity is maintained at a high level even after the regeneration.

EXAMPLE 3

Conversion of n-hexane

The catalyst was prepared as in Example 2-1 except using a gas mixture of 1% by volume of ammonia and 99% by volume of $N_2$ for the modification with ammonia and the conversion of n-hexane was carried out with the use of this catalyst under the same conditions as in Comparative Example 1. The results are shown in Table 1.

EXAMPLE 4

Conversion of n-hexane

The catalyst was prepared by conducting the modification with a gas mixture of 4% by volume of ammonia and 96% by volume of $N_2$ at 500° C. for 3 hours. The conversion of n-hexane was carried out with the use of this catalyst under the same conditions as in Comparative Example 1. The results are shown in Table 1.

EXAMPLE 5

Conversion of n-hexane

The catalyst was prepared by conducting the modification with a gas mixture of 1% by volume of ammonia and 99% by volume of $N_2$ at 500° C. for 1 hour. The conversion of n-hexane was carried out with the use of this catalyst under the same conditions as in Comparative Example 1. The results are shown in Table 1.

EXAMPLE 6

Conversion of n-hexane

The catalyst was prepared as in Example 2-1 except using a gas mixture of 5% by volume of ammonia, 50 volume % of $H_2$, and 45% by volume of $N_2$ for the modification with ammonia and the conversion of n-hexane was carried out with the use of this catalyst under the same conditions as in Comparative Example 1. The results are shown in Table 1.

COMPARATIVE EXAMPLE 2

Modification of ammonium type aluminogallosilicates with ammonia

Catalyst A was contacted with a gas mixture of 25% by volume of ammonia and 75% by volume of $N_2$ at 500° C. for 3 hours and then calcined at 600° C. in air for 3 hours to yield a hydrogen type crystalline aluminogallosilicate catalyst. The conversion of n-hexane was carried out with the use of this catalyst under the same conditions as in Comparative Example 1. The results are shown in Table 1.

TABLE 1

| | Yield of aromatic hydrocarbons (wt. %) | | |
|---|---|---|---|
| | 1 hr | 13 hr | 25 hr |
| Comparative example 1 | 64.6 | 62.5 | 60.9 |
| Example 1 | 66.0 | 64.7 | 62.2 |
| Example 2-1 | 66.9 | 65.6 | 63.8 |
| Example 2-2 | 67.2 | 64.8 | 63.3 |
| Example 3 | 66.3 | 65.1 | 63.4 |
| Example 4 | 67.0 | 65.8 | 63.6 |
| Example 5 | 66.3 | 65.1 | 63.4 |
| Example 6 | 68.5 | 66.8 | 65.6 |
| Comparative example 2 | 63.7 | 61.1 | 57.4 |

COMPARATIVE EXAMPLE 3

Conversion of propane

The conversion of propane was carried out in a flow reactor with the use of Catalyst B described in Supplementary Example 2 under the conditions where the temperature was 538° C., the pressure 1 atmosphere, the GHSV 780 hr$^{-1}$, the amount of catalyst (passing 16 to 28 mesh) 3 ml., and the reaction time 25 hours. The reaction products were analyzed by a gas chromatograph directly connected to the reactor. The results are shown in Table 2.

EXAMPLE 7

Conversion of propane

The conversion of propane was carried out with the use of the catalyst described in Example 2-1 under the same conditions as in Comparative Example 3. The results are shown in Table 2.

EXAMPLE 8

Conversion of propane

The conversion of propane was carried out with the use of the catalyst described in Example 7 under the same conditions as in Comparative Example 3 except setting the GHSV at 380 hr$^{-1}$. The results are shown in Table 2.

TABLE 2

| | Yield of aromatic hydrocarbons (wt. %) | | |
|---|---|---|---|
| | 1 hr | 13 hr | 25 hr |
| Comparative example 3 | 31.5 | 26.1 | 25.9 |
| Example 7 | 47.9 | 46.3 | 45.3 |
| Example 8 | 54.2 | 54.0 | 51.8 |

It is apparent from Table 2 that the yield of aromatic hydrocarbons from propane is markedly higher in the examples than in the comparative example.

COMPARATIVE EXAMPLE 4

Conversion of butane

The conversion of butane was carried out in a flow reactor with the use of Catalyst B described in Supplementary Example 2 under the conditions where the temperature was 538° C., the pressure 1 atmosphere, the GHSV 510 hr$^{-1}$, the amount of catalyst (passing 16 to 28 mesh) 3 ml., and the reaction time 25 hours. The reaction products were analyzed by a gas chromatograph directly connected to the reactor. The results are shown in Table 3.

EXAMPLE 9

Conversion of butane

The conversion of butane was carried out with the use of the catalyst described in Example 2-1 under the same conditions as in Comparative Example 4. The results are shown in Table 3.

TABLE 3

| | Yield of aromatic hydrocarbons (wt. %) | | |
|---|---|---|---|
| | 1 hr | 13 hr | 25 hr |
| Comparative example 4 | 47.0 | 44.4 | 44.0 |
| Example 9 | 58.6 | 57.8 | 56.3 |

It is apparent from Table 3 that the yield of aromatic hydrocarbons is markedly higher in the example than in the comparative example.

COMPARATIVE EXAMPLE 5

Catalyst activity after continuous use

The conversion of n-hexane as described in Comparative Example 1 and the catalyst regeneration were repeated 50 times. The catalyst after the 50th regeneration was used in the conversion of n-hexane and the results are shown in Table 4.

COMPARATIVE EXAMPLE 6

Effects of treatment with $H_2$

The catalyst after the 50th regeneration described in Comparative Example 5 was treated with $H_2$ at 500° C. for 3 hours and the resulting catalyst was used in the conversion of n-hexane under the same conditions as in Comparative Example 1. The results are shown in Table 4.

EXAMPLE 10

Effects of treating degraded catalyst with ammonia

The catalyst after the 50th regeneration described in Comparative Example 5 was treated with a gas mixture of 25% by volume of ammonia and 75% by volume of $N_2$ at 500° C. for 3 hours. The resulting catalyst was used in the conversion of n-hexane under the same conditions as in Comparative Example 1. The results are shown in Table 4. As shown in the table, the catalyst activity was restored strikingly in Example 10.

TABLE 4

| | Yield of aromatic hydrocarbons (wt. %) | | |
|---|---|---|---|
| | 1 hr | 13 hr | 25 hr |
| Comparative example 5 | 57.3 | 56.5 | 55.7 |
| Comparative example 6 | 60.7 | 59.5 | 58.3 |
| Example 10 | 63.5 | 63.7 | 63.3 |

COMPARATIVE EXAMPLE 7

Activity of degraded catalyst

Steam was introduced into the hydrogen type crystalline aluminogallosilicate catalyst or Catalyst B described in Supplementary Example 2 at 650° C. for 1 hour and the resulting catalyst was used in the conversion of n-hexane under the same conditions as in Comparative Example 1. The results are shown in Table 5.

EXAMPLE 11

Effects of treating degraded catalyst with ammonia

The catalyst described in Comparative Example 7 was treated with a gas mixture of 25% by volume of ammonia and 75% by volume of $N_2$ at 500° C. for 3 hours and the resulting catalyst was used in the conversion of n-hexane under the same conditions as in Comparative Example 1. The results are shown in Table 5.

TABLE 5

| | Yield of aromatic hydrocarbons (wt. %) | | |
|---|---|---|---|
| | 1 hr | 13 hr | 25 hr |
| Comparative example 7 | 47.9 | 34.2 | 30.4 |
| Example 11 | 61.2 | 58.7 | 56.4 |

COMPARATIVE EXAMPLE 8

Activity of degraded catalyst

The hydrogen type aluminogallosilicates obtained as in Supplementary Example 2 in the absence of the binder were treated with steam under the same conditions as in Comparative Example 7 and the resulting catalyst was used in the conversion of n-hexane under the same conditions as in Comparative Example 1. The results are shown in Table 6.

EXAMPLE 12

Effects of treating degraded catalyst with ammonia

The catalyst described in Comparative Example 8 was treated with a gas mixture of 25% by volume of ammonia and 75% by volume of nitrogen at 500° C. for 3 hours. The resulting catalyst was used in the conversion of n-hexane under the same conditions as in Comparative Example 1. The results are shown in Table 6. It is apparent from the table that the effect is smaller in Example 12 than in Example 11 in which alumina was used as binder.

TABLE 6

| | Yield of aromatic hydrocarbons (wt. %) | | |
|---|---|---|---|
| | 1 hr | 13 hr | 25 hr |
| Comparative example 8 | 50.0 | 36.8 | 29.6 |
| Example 12 | 58.7 | 43.3 | 38.5 |

INDUSTRIAL APPLICABILITY

The process of this invention for converting light hydrocarbons to high-octane gasoline blending stock can suppress the deposition of carbon on the catalysts, extend the catalyst life, and produce aromatic hydrocarbons in high yield over a prolonged period of time for its high conversion and high selectivity. Hence, the process has an advantage of increasing the productivity per catalyst and is a commercially effective one.

What is claimed is:

1. In preparing high-octane gasoline blending stock by treating light hydrocarbons mainly comprising of paraffins and/or olefins having 2 to 7 carbon atoms in the presence of a catalyst composition containing crystalline aluminogallosilicates as catalyst component at a hydrogen partial pressure of 5 kg/cm² or less and at a temperature from 350° to 650° C., a process for preparing high-octane gasoline blending stock which comprises using ammonia-modified crystalline aluminogallosilicates obtained by contacting hydrogen type aluminogallosilicates with ammonia under a dry condition as catalyst component.

2. A process for preparing high-octane gasoline blending stock as described in claim 1 wherein said modification with ammonia is effected by using a gas mixture of ammonia and an inert gas and/or hydrogen.

3. A process for preparing high-octane gasoline blending stock as described in claim 1 wherein said modification with ammonia is effected under the conditions where the pressure is 5 kg/cm² or less, the temperature is from room temperature to 700° C., and the time is from 0.1 to 24 hours.

4. A process for preparing high-octane gasoline blending stock as described in any one of claims 1 to 3 wherein said light hydrocarbons comprise mainly of paraffins and/or olefins having 2 to 4 carbon atoms.

5. A process for preparing high-octane gasoline blending stock as described in any one of claims 1 to 3 wherein said crystalline aluminogallosilicates are reactivated by contact with ammonia under a dry condition when the catalyst activity has declined after repeated regeneration by burning off coke in the catalyst composition.

6. A process for preparing high-octane gasoline blending stock as described in any one of claims 1 to 3 wherein said ammonia-modified crystalline aluminogallosilicates contain alumina as binder.

* * * * *